United States Patent [19] — Frappé

[11] 3,719,803

[45] March 6, 1973

[54] ELECTRONIC READING IN OF DESIGNS FOR THE PREPARATION OF PERFORATED JACQUARD CARDS

[75] Inventor: Pierre Frappé, Lyon, France

[73] Assignee: Verdol S.A., Lyon, France

[22] Filed: Jan. 18, 1972

[21] Appl. No.: 218,733

[30] Foreign Application Priority Data

Feb. 9, 1971 France..............................7/05100

[52] U.S. Cl.........235/61.11 E, 139/317, 235/61.6 H, 235/61.12 N

[51] Int. Cl........D03c 15/04, G06k 19/02, G06k 7/12

[58] Field of Search..235/61.11 E, 61.11 R, 61.11 G, 235/61.6 H, 61.7 B, 61.11 F; 340/146.3 B, 146.3 H, 174 BA, 174 JC; 139/317; 250/219 DC; 179/90 CS

[56] References Cited

UNITED STATES PATENTS

| | | | |
|---|---|---|---|
| 3,461,305 | 8/1969 | Moulton | 250/219 DC |
| 2,851,676 | 9/1958 | Woodcock | 340/174 |
| 3,986,725 | 5/1961 | Dirks | 235/61.11 D |
| 2,227,755 | 1/1941 | Keefe | 235/61.6 H |
| 3,592,972 | 7/1971 | Lane | 179/90 CS |

*Primary Examiner*—Thomas A. Robinson
*Assistant Examiner*—Robert M. Kilgore
*Attorney*—Arthur E. Dowell, Jr. et al.

[57] ABSTRACT

The invention refers to the electronic reading in systems for the designs on squared paper provided for the preparation of the perforated cards or paper used in loom jacquards. These systems generally comprise main photo-electric means which follow the successive horizontal rows of squares to detect the colors thereof and to emit corresponding main signals which are applied to the transducer circuits of a perforating machine through a gating circuit, and auxiliary photo-electric means which scan a succession of vertical lines (actually the vertical lines of the squared paper) to generate auxiliary conditioning signals which are applied to the gating circuit to only condition same when the main photo-electric means are just in front of the center of a square. In order to avoid that a defectively printed vertical line may cause a defective perforation, according to the invention the system further includes chronometric means which generate chronometric pulses in substantial synchronism with the auxiliary pulses, and if some of the latter are missing, these chronometric pulses act on the gating circuit to permit passage of the main signals while the main photo-electric means still scan the central portion of the respective squares to which the missing auxiliary pulses should have corresponded.

4 Claims, 9 Drawing Figures

ELECTRONIC READING IN OF DESIGNS FOR THE PREPARATION OF PERFORATED JACQUARD CARDS

In order to prepare the perforated cards or papers for loom jacquards there is first established on squared paper a large scale drawing or design in which each horizontal row of squares corresponds to one or more weft threads of the fabric to be woven, while each vertical row corresponds to one or more warp threads thereof. In the conventional method an operator or "reader in" follows the horizontal rows and he actuates the controlling members of a perforating machine in accordance with the squares of each row, theses squares being generally individualized by an appropriate number of different colors.

It has been proposed to dispense with this long, tedious and expensive procedure by using main photo-electric means arranged to selectively respond to the various colors of the drawing. This scanning of the successive squares is generally only effected in the central portion of each of them and for this purpose auxiliary photo-electric means are provided to read an appropriate scale, generally formed of the vertical lines of the squared paper, in unison with the displacement of the main photo-electric means along the horizontal row being read in, the signals from these auxiliary photo-electric means being applied to a gating circuit interposed between the main photo-electric means and the perforating machine. With such an arrangement the transducer circuits associated to the perforating machine may receive a succession of signals corresponding to the colors of the successive squares of each horizontal row.

But of course satisfactory operation of such an arrangement is only possible if the auxiliary photo-electric cell or like means detects all the successive lines of the squared paper, which requires that these lines be perfectly black and regular, without any pale portion. Since it often occurs in actual practice that owing to a somewhat defective printing such is not the case, the paper should be carefully checked and any defect in the vertical lines should be manually corrected before the reading in operation, which obviously implies a tedious and time consuming operation.

It is an object of the present invention to eliminate this disadvantage and to avoid that in a reading in system of the kind in question a defect in the vertical lines of the squared paper may cause a defective operation of the main photo-electric means which follow the horizontal rows of squares of the drawing.

In accordance with the present invention the reading in system comprises chronometric means adapted to generate signals which normally correspond to the successive passages of the auxiliary photo-electric means in front of vertical lines of the squared paper which they must detect, and means through which the signals from the chronometric means may act on the gating circuit of the system, at least in absence of any signal from the auxiliary photo-electric means, when the latter passes in front of the lines which it should normally detect.

In a first embodiment of the invention the chronometric signals are directly applied to the gating circuit and synchronizing means are provided to control the frequency of these signals in such manner that they remain in coincidence with the signals from the auxiliary photo-electric mans, but that they may actuate the gating circuit if some of these latter signals are missing. It will be understood that if the displacement of the various photo-electric means across the drawing is sufficiently uniform, which is generally the case in actual practice, it is possible to adjust the frequency of the chronometric means in such manner that the signals which they generate may substantially correspond with those issuing from the auxiliary photo-electric means. Under such conditions synchronization is easily maintained even if, owing to a defective printing of the vertical lines, a small number of successive signals from the auxiliary photo-electric means are missing.

In another embodiment the frequency of the chronometric signals is slightly lower than the frequency of the signals from the auxiliary photo-electric means and these two kinds of signals are applied to an OR gate the outlet of which is in turn applied to the gating circuit, while the signals from the auxiliary photo-electric means act on the chronometric means to return the latter to the beginning of an operative cycle before generation of the chronometric signal. If therefore a signal from the auxiliary photo-electric means is missing, the chronometric signal passes through the OR gate and act on the gating circuit.

In a third embodiment the negative pulses from the auxiliary photo-electric means are applied to a monostable circuit the period of which corresponds to a predetermined safety margin in the value of the repeating period of these auxiliary photo-electric means. If for instance the latter is equal to 800 micro-seconds, the period of the monostable circuit may be about 100 micro-seconds. The output of this monostable circuit is applied, through a first AND gate, to a second monostable circuit which, when the AND gate is conditioned, emits short pulses, for instance of 1 micro-second, which are directly applied to the gating circuit. There is besides provided a clock unit formed of two monostable circuits disposed in series with an intermediate inverter, the sum of the periods of these latter circuits being equal to the period of the auxiliary photo-electric means (in the above example the periods of the said circuits may be respectively 500 and 300 micro-seconds). The output of the first of these circuits is also applied to the first inlet of a bistable flip-flop circuit the first outlet of which is connected with a first NAND gate interposed between this circuit and the clock unit. The second inlet of the bistable flip-flop circuit is connected with the outlet of the clock unit and its second outlet is connected with the second inlet of the first AND gate through a second NAND gate. The second inlet of this second NAND gate is connected with the outlet of the clock unit. Finally the outlet of the second NAND gate is connected with the first inlet of a second AND gate interposed between the first NAND gate and the inlet of the clock unit.

With such an arrangement the clock unit is tripped 100 micro-seconds after each pulse of the auxiliary photo-electric means. This clock unit and the bistable flip-flop condition the first AND gate at the proper time in such manner that the next rectangular pulse from the first monostable circuit (period of micro-seconds) micro-seconds) reaches the second monostable circuit (period of 1 micro-second) which applies a pulse to the gating circuit, while if a signal from the auxiliary photo-electric means is missing, the clock unit acts on the second monostable circuit while emits a pulse 100 micro-seconds after the time at which the signal from the auxiliary photo-electric means should have appeared.

Whatever may be the embodiment which is carried into practice, the transducer circuits will always receive a signal substantially corresponding to the successive vertical lines of the squared paper either from the auxiliary photo-electric means or from the chronometric means. In the annexed drawings.

Figure 6:
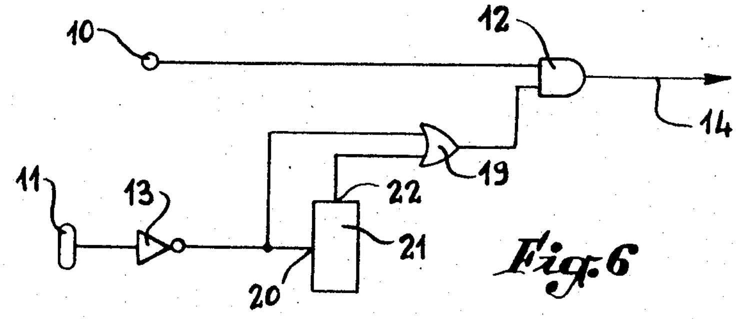

FIG. 6 diagrammatically shows another embodiment of a system according to the invention, comprising a multivibrator which is normally maintained inoperative by the signals from the auxiliary cell.

Figure 7:
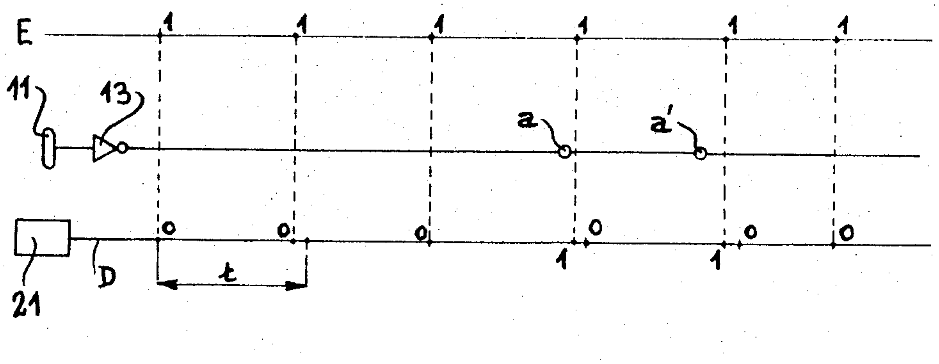

FIG. 7 illustrates the succession of signals in the embodiment of FIG. 6.

Figure 8:
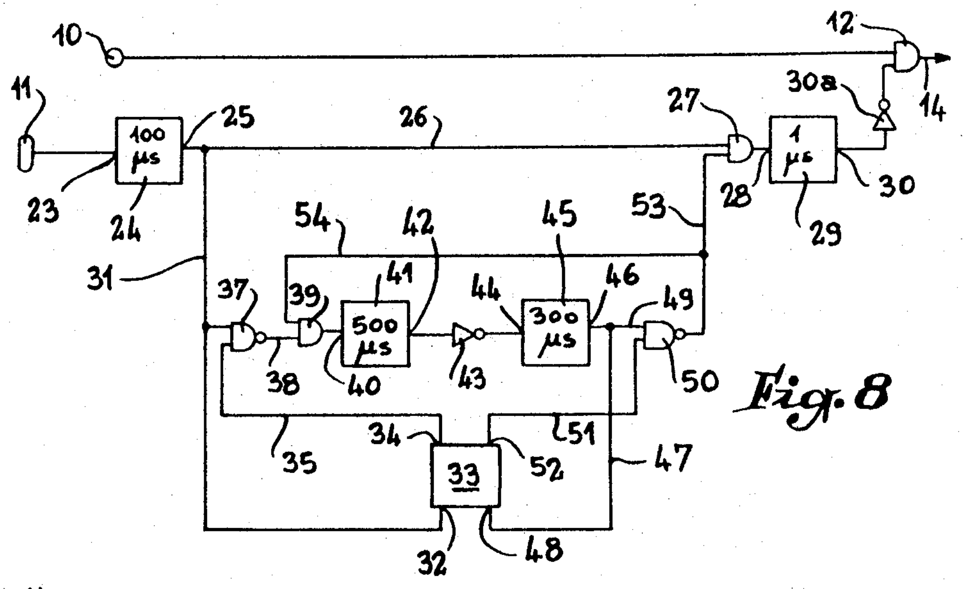

FIG. 8 shows a further embodiment of a system according to the present invention, embodying a clock unit.

Figure 9:
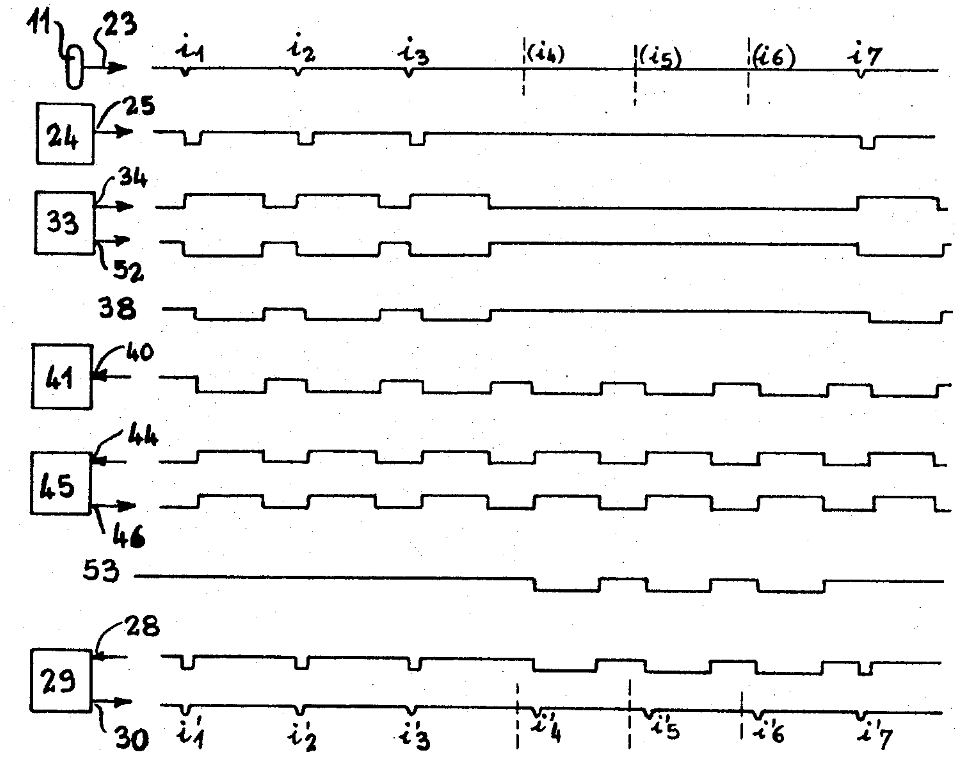

FIG. 9 illustrates the various successive signals in the embodiment of FIG. 8.

Figure 1:
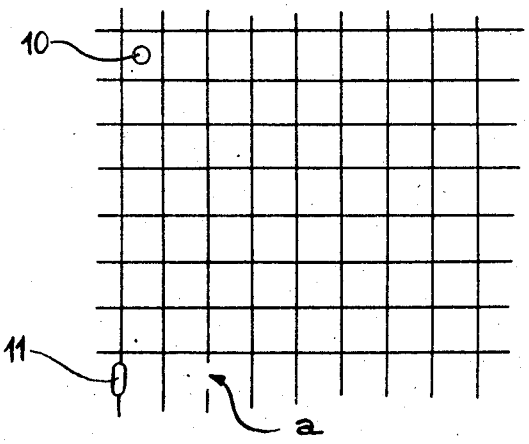
FIG. 1 is a diagrammatical view showing a design on squared paper being read in by a main photo electric cell and by an auxiliary photo-electric cell.

Referring to FIG. 1 the squared paper adapted to receive the drawing or design which corresponds to the fabric to be woven comprises in practice a considerable number of squares, some only of which have been illustrated. Each horizontal row conventionally corresponds to a weft thread and each vertical row to a warp thread, being noted that nothing prevents from considering that each row may correspond to more than one thread which are to be woven in unison. The design is painted in colors and the problem to be solved is to follow its successive horizontal rows of squares while detecting the color in the center of each square.

For this purpose there is used for each color a main photo-electric cell 10 which scans the successive squares and an auxiliary photo-electric cell 11 which detects the successive vertical lines of the squared paper, all these cells being mounted on a common carriage in such a manner that the signals from the auxiliary cell appear just when the main cell 10 is in front of the center of a square, in order to condition the gating circuit through which the signals from the said main cell may reach the transducer circuits associated to the perforating machine.

Figure 2:
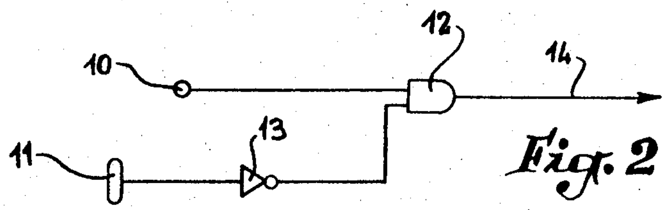
FIG. 2 illustrates the circuit which is conventionally used to combine the signals from both cells.

FIG. 2 illustrates very diagrammatically a conventional circuit adapted to combine the signals from both cells. An AND gate 12 has its two inlets respectively connected with the outlet of the main photo-electric cell 10 and with the outlet of an inverter 13 the inlet of which is connected with the outlet of the auxiliary cell 11. When the latter detects the white color of the paper (its output signal being binary one) the second inlet of gate 12 receives the binary signal zero and the said gate is therefore blocked, its output being also at lower or zero level. When on the contrary the auxiliary cell passes in front of a vertical line of the squared paper, it emits a signal zero and therefore inverter 13 applies a signal one to the second inlet of gate 12 which is thus conditioned for passage of the signal issuing from the main cell 10, this latter signal being therefore applied to the outlet wire 14 of the circuit.

The disadvantage of this known arrangement is that if one of the vertical lines of the squared paper is defectively printed, as for instance as illustrated at *a* in FIG. 1, it is not detected by cell 11 and therefore a defect appears in the remainder of the horizontal row as read in by the main cell 10.

Figure 3:
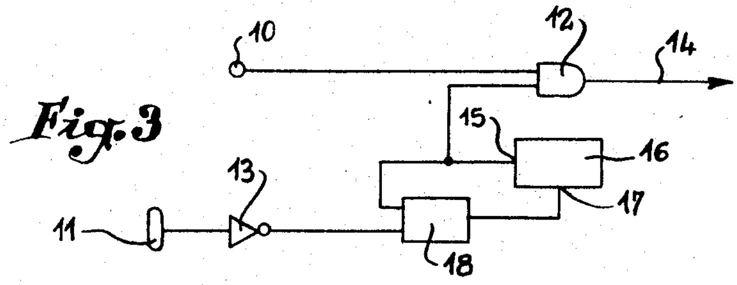
FIG. 3 shows how the circuit of FIG. 2 may be modified in accordance with the present invention.
Figure 4:
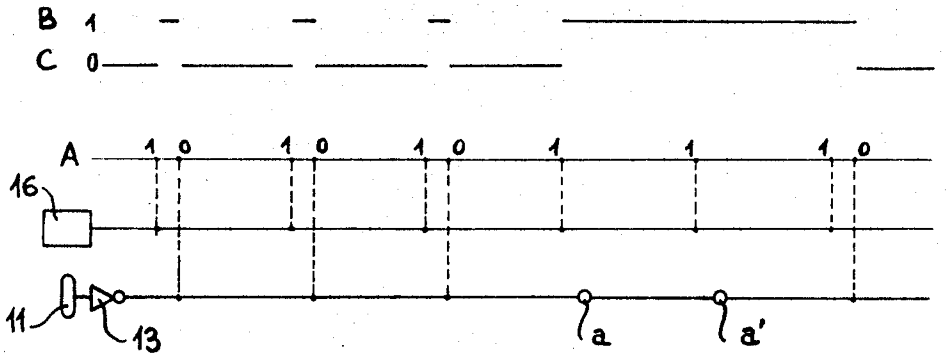
FIG. 4 and 5 are diagrams illustrating the succession of the signals from the auxiliary cell and from the chronometric pulse generator of FIG. 3 respectively when this generator is leading or lagging with respect to the auxiliary cell.

In the embodiment of FIG. 3 the second inlet of AND gate 12 receives signals from the outlet 15 of a chronometric pulse generator 16. The latter has a frequency controlling inlet 17 which is connected with the outlet of a comparator 18. Comparator 18 receives both the output of generator 16 and the output of the inverter 13 associated with the auxiliary cell 11. Comparator 18 is so arranged as to emit different signals in accordance with the order in which it receives its inlet signals. It may be formed for instance of a mere bistable circuit or flip-flop. FIG. 4 clearly illustrates the operation.

Generator 16 is so adjusted that the frequency of its chronometric pulses is substantially equal to the frequency of the passage of the vertical lines in front of cell 11, i.e., to the operating frequency of cell 11. It acts on the comparator or bistable flip-flop 18 in such manner as to bring the output thereof to binary level 1 as indicated on line A of FIG. 4. On the contrary the signals received from inverter 13 (or more exactly from the unit comprised of auxiliary cell 11 and of inverter 13) return the said output to binary level 0. In the case illustrated in FIG. 4 generator 16 is slightly leading with respect to unit 11–13 as shown by the succession of points 1 and 0 along line A. Referring to lines B and C the dashes of which correspond respectively to the successive states 1 and 0 of the output of flip-flop 18, it may be seen that the periods of state 0 are much longer than those of state 1. State 0 is therefore prevailing and this has for its result to progressively slow down generator 16 until it is exactly in step with unit 11–13.

Figure 5:
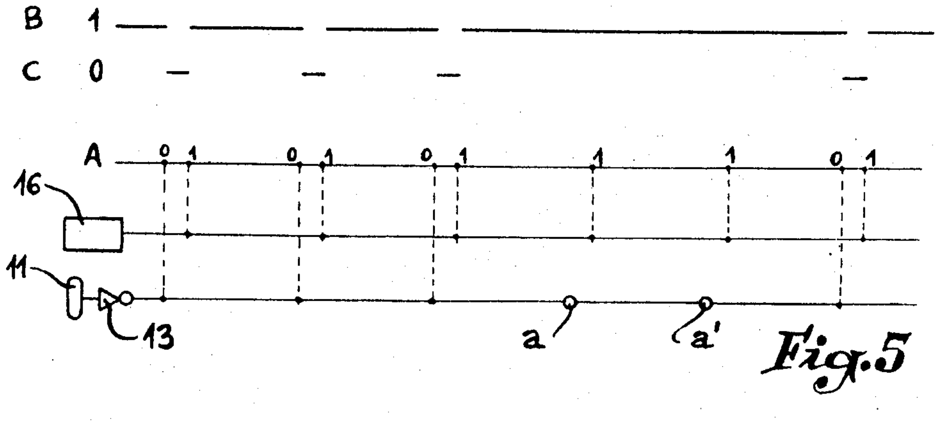

On the contrary in the case illustrated in FIG. 5 wherein generator 16 is lagging with respect to unit 11–13, state 1 is prevailing and this accelerates progressively generator 16.

Under normal conditions, i.e., if the vertical lines of the squared paper are perfectly printed, generator 16 is in accurate unison with unit 11–13 and it therefore feeds its signals to gate 12 exactly in step with the signals emitted by unit 11–13. In other words the circuit of FIG. 3 operates as the circuit of FIG. 2.

But if one or more vertical lines of the squared paper are missing in the zone scanned by the auxiliary cell 11, the circuits of FIGS. 2 and 3 operate in a quite different manner. While with the circuit of FIG. 2 one more of the signals which should have been emitted by the unit 11–13 are missing, thus causing a defective perforation of the card, with the circuit of FIG. 3 gate 12 still receives the chronometric pulses from generator 16. This has been illustrated in FIG. 4 wherein the small circles *a* and *a'* represent the points where the missing signals from unit 11–13 should have appeared. It is clear that generator 16 goes on emitting its chronometric pulses as if there were no defect in the vertical lines of the squared paper. Of course the synchronizing operation of comparator or flip-flop 18 is perturbed owing to the uninterrupted extension of state 1 which tends to increase the advance of generator 16, but this is not a major inconvenience since in practice the adjustment of the frequency of generator 16 by the output of comparator 18 is quite progressive and slow.

It will further be noted that if in the case of FIG. 4 the extension of state 1 acts against synchronization, on the contrary in the case of FIG. 5 it acts in the proper direction, which means that in practice there is an advantage to provide for generator 16 a frequency slightly higher than the operating frequency of unit 11–13.

Of course the above explanations assume that the displacement of cell 11 with respect to the squared paper is substantially uniform, which is generally the case in actual practice. It is further necessary that the beginning of each horizontal row generator 16 be substantially synchronized with respect to cell 11. This may be obtained by providing a blank zone of squares along the left-hand edge of the paper.

The chronometric pulse generator 16 may be of any known construction. It may be realized in the form of a multivibrator, the synchronizing inlet 17 acting on the biassing potential of one of its elements. It is possible to use an oscillator or multivibrator having a relatively high frequency, in combination with a counter which would emit a pulse for each *n* oscillations, inlet 17 acting on a gating circuit interposed between the oscillator or multivibrator and the counter in order to block a variable number of the pulses applied to the counter.

In the arrangement of FIG. 6 the output of inverter 13 is applied to an OR gate 19 having its outlet connected with the second inlet of AND gate 12. The output of inverter 13 is also applied to the inlet 20 of an unstable multivibrator 21, the outlet 22 of which is connected with the second inlet of OR gate 19.

The operation of the circuit of FIG. 6 will be described with reference to FIG. 7 wherein the outputs of the various circuits or units are illustrated along horizontal lines as in FIG. 4 and 5. When the auxiliary cell 11 passes in front of the first vertical line of the squared paper, its output sinks to binary level 0, which means that the output of inverter 13 (i.e., of unit 11–13) rises to binary level 1. The corresponding pulse passes through OR gate 19 and reaches AND gate 12 which is thus conditioned for passage of the color signal from the main cell 10. But at the same time the output of unit 11–13 has brought multivibrator 21 to a predetermined state; the arrangement is such that its output then corresponds to binary level 0. As clearly illustrated in FIG. 7 the operating period of multivibrator 21 (in other words the time during which it remains at its unstable state 0) is slightly longer than the operating period of unit 11–13 (the time which elapses between two successive passages of cell 11 in front of a vertical line). It results therefrom that somewhat before its period is ended, multivibrator 21 is again set to binary level 0. In other words as long as unit 11–13 operates normally, i.e., as long as the vertical lines of the squared paper are uniformly printed in the zone scanned by auxiliary cell 11, multivibrator 21 remains inoperative at its state 0 and gate 12 only receives the regular pulses from unit 11–13 through OR gate 19, as indicated by the three first points "1" on line E.

But if a vertical line is missing (circle *a*), multivibrator 21 is free to return to its state 1 and it thus applies a conditioning pulse to AND gate 12 through OR gate 19 as indicated by the fourth point "1" on line E and by the first point "1" on line D.

It is obvious that for satisfactory operation the difference between the operating periods of multivibrator 21 and of unit 11–13 should be as small as possible.

If as indicated in FIG. 7 by circle *a'*, two successive vertical lines are missing, multivibrator 21 should be able to emit a second conditioning pulse at the proper time and this implies that its return from state 1 to state 0 should be extremely rapid. When this condition is fulfilled, multivibrator 21 may act on gate 12 while the main cell 10 is still in front of the central portion of a square. When thereafter the auxiliary cell 11 again detects a well printed vertical line, it positively maintains multivibrator 21 at its predetermined state 0 and normal operation may be resumed.

In the embodiment of FIG. 8 and 9 inverter 13 is dispensed with and the negative pulses from auxiliary cell 11 are directly used, as indicated by the first horizontal line of the graphic representation of FIG. 9 which corresponds to the output of this cell. For the sake of clarity it will be supposed that the period of these pulses is 800 micro-seconds. The pulses from cell 11 are applied to the inlet 23 of a first monostable multivibrator or flip-flop 24 having a much shorter period, namely 100 micro-seconds in the example illustrated. The outlet 25 of this circuit is normally at binary level 1, but when it is set by a pulse from cell 11, its output sinks to binary level 0 during 100 micro-seconds and then returns to level 1, as clearly shown by the rectangular negative pulses along the second horizontal line of FIG. 9.

A first wire 26 connects the outlet 25 of circuit 24 with the upper inlet of a first AND gate 27. The outlet 28 of this gate is in turn connected with the inlet of a second monostable circuit 29 of quite short period, namely 1 micro-second in the example illustrated. The outlet 30 of this circuit 29 is connected with the second or lower inlet of gate 12 through an inverter 30*a*.

The outlet 25 of circuit 24 is also connected by another wire 31 the first inlet 32 of a bistable circuit or flip-flop 33. The first outlet 34 of this flip-flop is connected by a wire 35 with the lower inlet of a NAND gate 37 the other inlet of which is connected with wire 31. The outlet of NAND gate 37 is in turn connected by a wire 38 with an inlet of a second AND gate 39 the output of which is applied to the inlet 40 of a third monostable circuit 41 having a period of 500 micro-seconds in the case illustrated. The outlet 42 of this circuit is connected through an inverter 43 with the inlet 44 of a fourth monostable circuit 45 having a period equal to 300 micro-seconds. Circuits 41 and 45 form the clock unit of the system and it will be noted that the total of their periods is equal to the operating period of cell 11, namely 800 micro-seconds.

A wire 47 connects the outlet 46 of circuit 45 with the second inlet 48 of flip-flop 33. Another wire 49 connects outlet 46 with the first or upper inlet of a second NAND gate 50, the second or lower inlet of which is connected by a wire 51 with the second outlet 52 of flip-flop 33. The outlet of this gate 50 is itself connected by a wire 53 with the second inlet of NAND gate 27. Wire 53 is in turn connected by a wire 54 with the second or upper inlet of AND gate 39.

The operation is as follows:

As shown in FIG. 9 auxiliary cell 11 emits regularly very short negative pulses $i_1$, $i_2$, $i_3$, the operating period, i.e., 800 micro-seconds, being substantially equal to the total period (500 micro-seconds + 300 micro-seconds) of the clock unit 41–45. But it may occur that some pulses from cell 11 be missing, as indicated at $i_4$, $i_5$, $i_6$ and this is the drawback which should be eliminated.

Under the action of the negative pulses from the auxiliary cell 11 the first monostable circuit 24 generates negative rectangular signals having a duration of 100 micro-seconds, as indicated by the second horizontal line in FIG. 9.

The first outlet 34 of flip-flop 33 is normally at binary level 0, but when this flip-flop receives a signal from circuit 24 through wire 31, the said outlet passes to level 1 (third line in FIG. 9). The second outlet 52 of flip-flop 33 obviously behaves in the reverse manner ( fourth line in FIG. 9).

When the outlet 25 of circuit 24 returns to level 1, i.e., 100 micro-seconds later, the resulting transition 0–1 is applied to the first inlet of NAND gate 37 while the second inlet thereof receives the positive level (level 1) from the first outlet 34 of flip-flop 33. The output of this NAND gate which was normally at level 1 on wire 38, sinks to level 0 (fifth line in FIG. 9). The second AND gate 39, which was formerly conditioned as explained below, is therefore blocked and applies level 0 to the inlet 40 of the third monostable circuit 41. The outlet 42 of the latter, which was at level 1, therefore sinks to level 0 during 500 micro-seconds. Owing to the presence of inverter 43, the inlet 44 of circuit 45, which was at level 0, receives level 1 during this time of 500 micro-seconds. It results therefrom that the outlet of this circuit 45, which was normally at level 1, will sink to level 0 during 300 micro-seconds (period of circuit 45), this level 0 being applied to the first inlet of the second NAND gate 50. Gate 50 will thus remain blocked for 300 micro-seconds whatever may be the state of flip-flop 33. Its outlet will therefore remain at a level 0 on wire 53.

The first AND gate 27 is thus conditioned by the positive potential (or binary level 1) received on its second or lower inlet through wire 53. The negative pulses from the outlet 25 of the first monostable circuit 24 are therefore applied to the inlet 28 of the second monostable circuit 29 as indicated in the tenth line of FIG. 9. This latter circuit will be tripped by the successive transitions 1–0 received from circuit 24 through wire 26 and gate 27, and it will generate short negative pulses $i'_1$, $i'_2$, $i'_3$ (see the eleventh line in FIG. 9) which will be transformed into positive pulses (level 1) adapted to condition AND gate 12.

As to the clock unit formed of monostable circuits 41 and 45, it only returns flip-flop 33 to its initial state at the beginning of the rectangular signal of 300 micro-seconds generated by the second clock circuit 45, the transition 1–0 which then appears on the outlet of this circuit being transmitted to the second inlet of the said flip-flop through wire 47. This re-setting of flip-flop 33 to its initial state occurs 500 micro-seconds after the setting of circuit 41, i.e., 600 micro-seconds after the setting of the first monostable circuit 24. Since the successive signals or pulses emitted by the auxiliary cell 11 are normally spaced from each other by a time or period of 800 micro-seconds, the return or re-setting of flip-flop 33 to its initial state is certainly effected when the next pulses from cell 11 is generated.

If a negative pulse from cell 11 is missing owing to a defective vertical line of the squared paper (as for instance pulse $i_4$ in FIG. 9), the first monostable circuit 24 is unactuated together with flip-flop 33. The outlet 25 of circuit 24 and wire 31 remain at binary level 1 (positive level), but since the outlet 34 of flip-flop 33 is at level 0, the first NAND gate 37 is blocked and wire 38 remains at level 1 whereby the second AND gate 39 is conditioned. The second NAND gate 50 is also conditioned, since the outlet 52 of the flip-flop 33 is at level 1. The output from circuit 45 may therefore pass and act through wires 53 and 54 on the first inlet of the second AND gate 39 to trip circuit 41. Under these conditions this latter circuit goes on operating with circuit 45 and it emits on wire 49 a succession of positive pulses (level 1) of 500 micro-seconds and of negative pulses (level 0) of 300 micro-seconds. These pulses are inverted by the second NAND gate 50 which acts in this case as an inverter, they pass through the first AND gate 27 which is conditioned by the positive level (level 1) of wire 26 and they reach the second monostable circuit 29 which is tripped at each 1–0 transition to emit a very short negative signal $i'_4$, $i'_5$, etc . . . This signal is applied to inverter 30 *a* and it is transformed by inverter 30*a* into a positive signal applied to AND gate 12.

These signals $i'_4$, $i'_5$, . . . are not in accurate coincidence with the signals $i_4$, $i_5$, . . . which the auxiliary cell 11 would have generated if the vertical lines of the squared paper had not been defective, since the clock unit 41–45 is lagging with respect to cell 11, the difference being equal to the operating period of the first monostable circuit 24, i.e., 100 micro-seconds. But in actual practice this difference is negligible and has no effect on the general operation of the reading in system, while on the contrary it constitutes a safeguard against possible variations in the operating rate of the auxiliary cell, or more exactly of the driving mechanism thereof. In the present instance this difference amounts to 12.5 percent of the operating period of the auxiliary cell, which means that when the signal from the main cell 10 is passed by AND gate 12, this cell is still well in front of the central portion of the corresponding square. On the other hand, as long as the speed variations of the movable carriage which supports the cells in front of the squared paper do not reach 12.5 percent, the circuitry of FIG. 9 operates correctly to eliminate the drawback resulting from defective vertical lines.

I claim:

1. In a system for the electronic reading in of designs on squared paper for the preparation of the perforated cards or papers used in loom jacquards and for the control of a perforating machine in accordance with said design, the said system including:

main photo-electric means which are moved at a substantially constant speed with respect to said paper to scan the squares of the successive rows of squares thereof so as to detect at least one of the colors of the design and to generate corresponding main signals;

a gating circuit through which said main signals may reach the perforating machine to control same, said gating circuit being normally blocked;

and auxiliary photo-electric means which detect a series of successive lines in unison with the scanning of the centers of the successive squares by said photo-electric means to generate corresponding auxiliary pulses at a substantially constant frequency, said auxiliary pulses acting on said gating circuit to condition same for passage of said main signals towards the perforating machine;

the improvement according to which said system further comprises:

chronometric means to generate chronometric pulses at a frequency substantially equal to the frequency of said auxiliary pulses;

means to substantially synchronize said chronometric pulses with said auxiliary pulses in such manner that each of said chronometric pulses appears while said main photo-electric means scan the central portion of a square;

and means to apply said chronometric pulses to said gating circuit at least when one of said auxiliary pulses is missing to condition said gating circuit for passage of said main signal.

2. In a system as claimed in claim 1:

said chronometric means being in the form of a pulse generator having an outlet connected to said gating circuit and a synchronizing inlet through which the frequency of said generator may be adjusted;

and said system further comprising a comparator having a first inlet connected to the outlet of said generator, a second inlet connected to said auxiliary photo-electric means to receive said auxiliary pulses therefrom, and an outlet connected to the synchronizing inlet of said generator to alter the frequency thereof in response to the order in which said comparator receives the chronometric pulses from said generator and the auxiliary pulses from said auxiliary photo-electric means.

3. In a system as claimed in claim 1:

said chronometric means being in the form of a monostable circuit having a stable state and an unstable state, and including an inlet connected to said auxiliary photo-electric means to be brought to its unstable state by said auxiliary pulses, and said monostable circuit also having an outlet, the period of said monostable circuit to return from its unstable state to its stable state in the absence of any pulse on its inlet and to emit a corresponding pulse on its outlet being longer than the period which corresponds to the frequency of said auxiliary pulses;

said system further comprising OR gate means having an outlet connected to said gating circuit, a first inlet connected to said auxiliary photo-electric means, and a second inlet connected to the outlet of said monostable circuit;

and the difference between the periods of said monostable circuit and of said auxiliary pulses being so small that when an auxiliary pulse emitted by said monostable circuit at the end of its period may condition said gating circuit through said OR gate means while said main photo-electric means still scan the central portion of the square to the center of which said missing auxiliary pulse should have corresponded.

4. In a system as claimed in claim 1:

said chronometric means being in the form of a clock unit including two monostable clock circuits connected in series with each other by an inverter, the sum of the periods of said monostable clock circuits being equal to the period which corresponds to the frequency of said auxiliary pulses, said clock unit having an inlet and an outlet said system further comprising:

a. an inlet monostable circuit having an unstable state and a stable state, said inlet monostable circuit including an inlet connected to said auxiliary photo-electric means to receive said auxiliary pulses which bring said inlet circuit to its unstable state and said inlet circuit also having an outlet, with the period of said inlet circuit to return from its unstable state to its stable state being equal to the safety margin desired for the value of the period of said auxiliary pulses;

b. first AND gate means having a first inlet, a second inlet and an outlet, with the first inlet of said first AND gate means being connected to the outlet of said inlet monostable circuit;

c. an outlet monostable circuit having an unstable state and a stable state with the period of said outlet monostable circuit to return from its unstable state to its stable state being much shorter than the period of said inlet monostable circuit, said outlet monostable circuit including an inlet connected to the outlet of said first AND gate means, and also including an outlet;

d. an outlet inverter having an inlet connected to the outlet of said outlet monostable circuit and an outlet connected to said gating circuit;

e. a bistable circuit having a first and a second inlet and a first and a second outlet, with the first inlet of said bistable circuit being connected to the outlet of said inlet monostable circuit and with the second inlet of said bistable circuit being connected to the outlet of said clock unit;

f. first NAND gate means having a first inlet connected to the outlet of said inlet monostable circuit, a second inlet connected to the first outlet of said bistable circuit, and an outlet;

g. second AND gate means having a first inlet connected to the outlet of said first NAND gate means, a second inlet connected to the second inlet of said first AND gate means, and an outlet connected to the inlet of said clock unit;

h. and second NAND gate means having a first inlet connected to the outlet of said clock unit, a second inlet connected to the second outlet of said bistable circuit, and an outlet connected to the second inlet of said first AND gate means;

and the auxiliary pulses from said auxiliary photo-electric means causing said inlet monostable circuit to emit corresponding pulses to act on said outlet monostable circuit through said first AND gate means which are conditioned due to said second NAND gate means being blocked by the outlet of said clock unit, and said outlet monostable circuit in turn applying a conditioning pulse to said gating circuit through said outlet inverter, while when one of said auxiliary pulses is missing, said clock unit applies a chronometric pulse to said outlet monostable circuit through said second NAND gate means and through said first AND gate means after a time equal to the period of said inlet monostable circuit, said clock unit being thereafter reset through said second NAND gate means and through said second AND gate means.

* * * * *